United States Patent
Fan et al.

(10) Patent No.: US 11,049,435 B2
(45) Date of Patent: Jun. 29, 2021

(54) OPTICAL DETECTING DEVICE

(71) Applicant: Qisda Corporation, Taoyuan (TW)

(72) Inventors: Tse-Wei Fan, Taoyuan (TW); Feng-Lin Chen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/776,552

(22) Filed: Jan. 30, 2020

(65) Prior Publication Data

US 2020/0265772 A1 Aug. 20, 2020

(30) Foreign Application Priority Data

Feb. 19, 2019 (CN) .......................... 201910122454.9

(51) Int. Cl.
*G09G 1/00* (2006.01)
*G09G 3/20* (2006.01)
*H04N 5/64* (2006.01)

(52) U.S. Cl.
CPC ............. *G09G 3/2092* (2013.01); *H04N 5/64* (2013.01); *G09G 2320/0276* (2013.01); *G09G 2320/0666* (2013.01); *G09G 2320/0693* (2013.01)

(58) Field of Classification Search
CPC .................. G09G 2360/14–148; G09G 3/3473
See application file for complete search history.

(56) References Cited

U.S. PATENT DOCUMENTS

| | | | |
|---|---|---|---|
| 2008/0204437 A1* | 8/2008 | Jensen | G01J 1/04 345/207 |
| 2009/0160834 A1* | 6/2009 | Tseng | H04N 5/65 345/207 |
| 2017/0047024 A1* | 2/2017 | Hogo | G09G 3/2003 |

FOREIGN PATENT DOCUMENTS

CN 106384563 A 2/2017

OTHER PUBLICATIONS

Office action of counterpart application by SIPO dated Mar. 18, 2021.

* cited by examiner

*Primary Examiner* — Sanghyuk Park

(57) ABSTRACT

An optical detecting device includes a receiving box and a telescopic arm. The receiving box includes an electrical connection port and a first conductive portion electrically connected to the electrical connection port. The telescopic arm is slidably disposed in the receiving box and includes an optical sensor and a second conductive portion electrically connected to the optical sensor. When the telescopic arm and the receiving box are in different sensing positions, the first conductive portion is electrically connected to the second conductive portion.

20 Claims, 7 Drawing Sheets

OPTICAL DETECTING DEVICE

This application claims the benefit of People's Republic of China application Serial No. 201910122454.9, filed Feb. 19, 2019, the subject matter of which is incorporated herein by reference.

BACKGROUND OF THE INVENTION

Field of the Invention

The present disclosure relates to an optical detecting device, and more particularly to a flexible optical detecting device.

Description of the Related Art

Conventional optical detecting device is generally hung on a display device using an external wire for detecting color information of the display device. However, such detecting method can't more conveniently detect several different positions of the frame, such as the middle position of the frame. Therefore, how to propose a new optical detecting device to improve the aforementioned problems is one of the efforts of the practitioners in the technical field.

SUMMARY OF THE INVENTION

The invention is directed to an optical detecting device capable of resolving the abovementioned problems encountered in the prior art.

According to an embodiment of the present invention, an optical detecting device applicable to a display device having a display panel and a first electrical connection port is provided, wherein the first electrical connection port is disposed on a side of the display panel, and the optical detecting device includes a receiving box and a telescopic arm. The receiving box includes a second electrical connection port and a first conductive portion electrically coupled to the second electrical connection. The telescopic arm is slidably disposed in the receiving box and includes an optical sensor and a second conductive portion, wherein the second conductive portion is electrically connected to the optical sensor. When the second electrical connection port is electrically coupled to the first electrical connection port and the telescopic arm slides relative to the receiving box, the optical sensor faces a plurality of different sensing positions of the display panel, and the first conductive portion and the second conductive portion maintain an electrically-connecting state.

According to another embodiment of the present invention, an optical detecting device applicable to a display device including a display panel and a first electrical connection port is provided, wherein the first electrical connection port is disposed on a side of the display panel, and the optical detecting device includes a receiving box, a first conductive portion and a telescopic arm. The receiving box includes a second electrical connection port. The first conductive portion electrically is coupled to the second electrical connection port. The telescopic arm is slidably disposed in the receiving box and includes an optical sensor and a plurality of second conductive portions separated from each other, wherein the second conductive portions are electrically connected to the optical sensor. When the second electrical connection port is electrically coupled to the first electrical connection port and the telescopic arm slides relative to the receiving box, the optical sensor faces a plurality of different sensing positions of the display panel, and the first conductive portion is electrically connected to the different second conductive portion.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
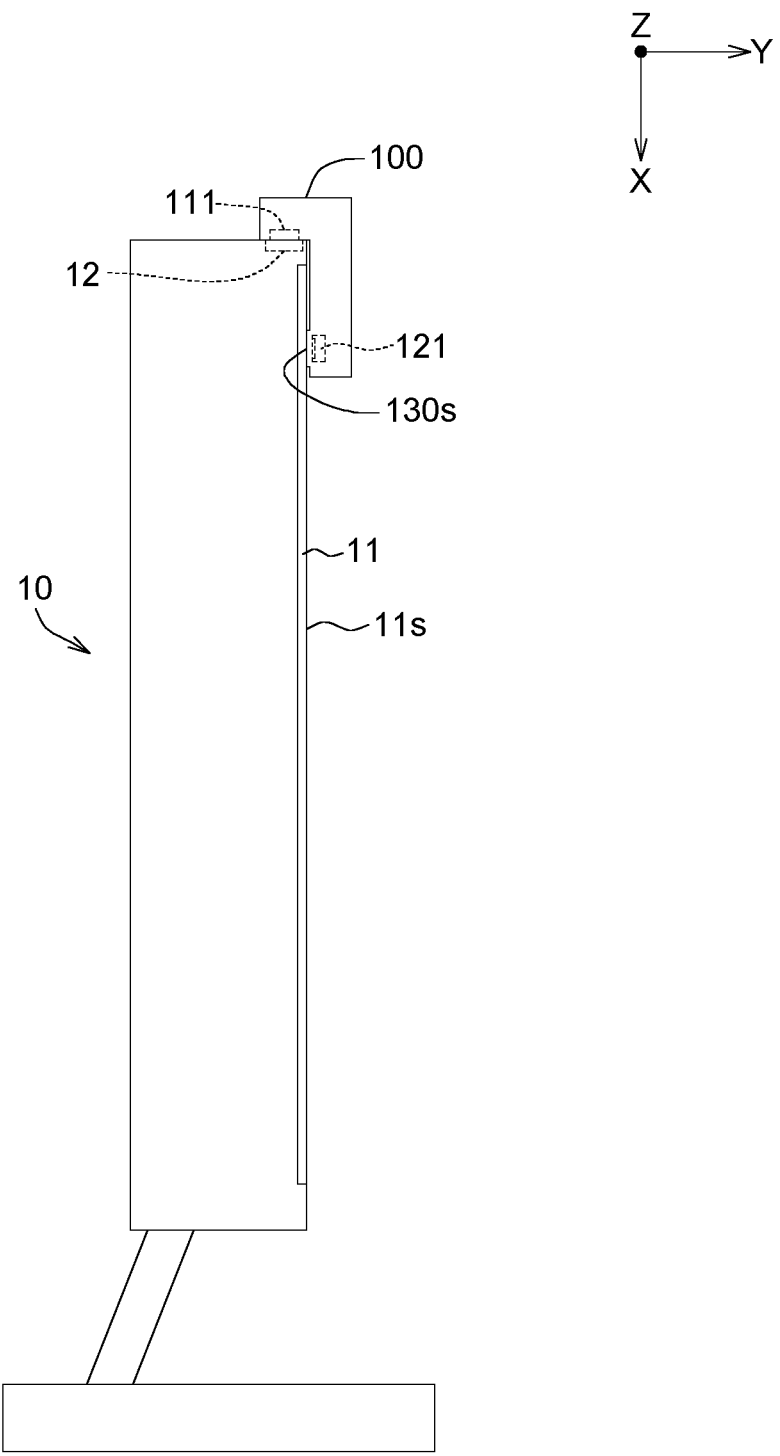
FIG. 1 is a schematic diagram of the optical detecting device being hung on the display device according to an embodiment of the present invention.
Figure 2A:
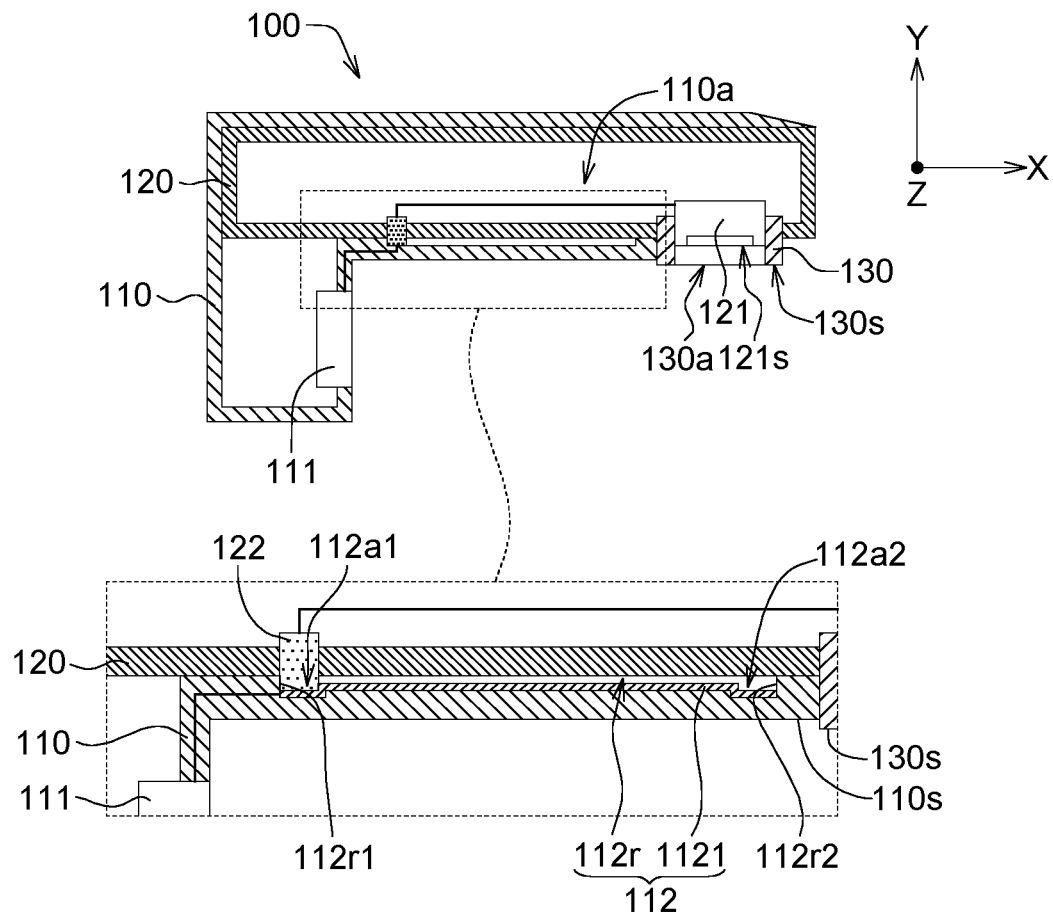
FIG. 2A is a schematic diagram showing the telescopic arm of the optical detecting device of FIG. 1 being located within the receiving box.
Figure 2B:
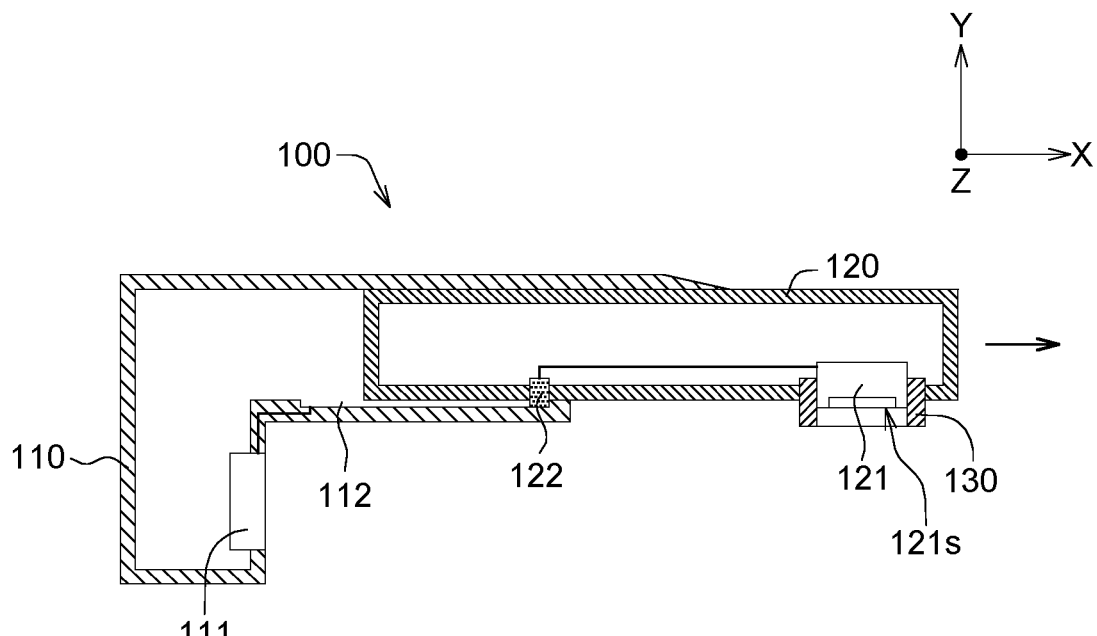
FIG. 2B is a schematic diagram showing the telescopic arm of FIG. 2A protruding with respect to the receiving box.
Figure 2C:
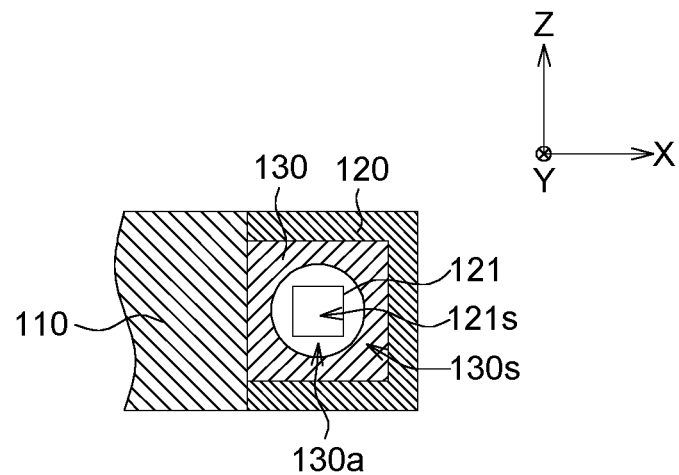
FIG. 2C is a bottom-view of the light shielding of FIG. 2A.
Figure 2D:
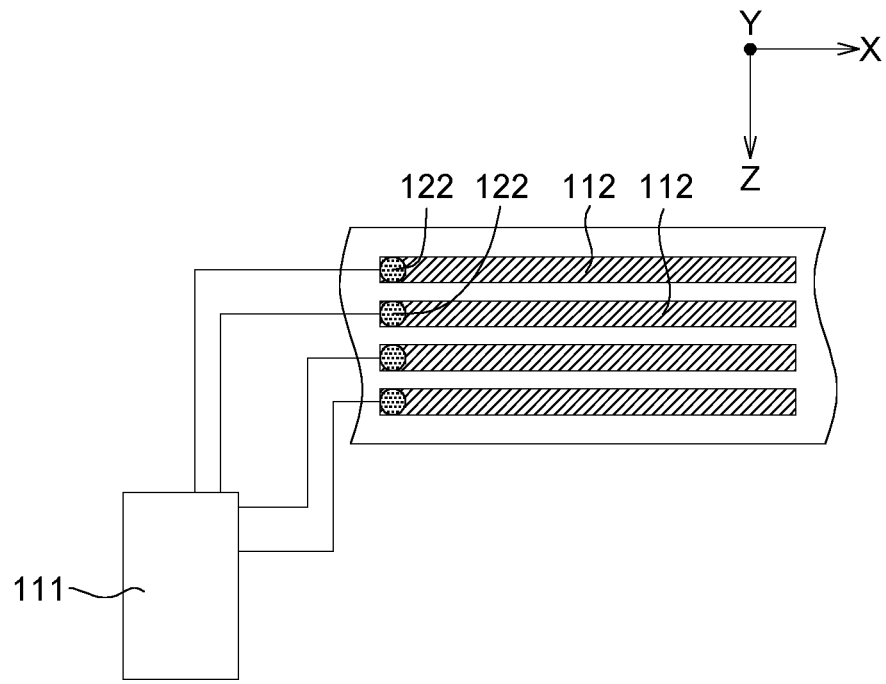
FIG. 2D is a top-view showing of a number of first conductive portions and a number of second conductive portions in FIG. 2A.

Referring to FIGS. 1 and 2A to 2D. FIG. 1 is a schematic diagram of the optical detecting device 100 being hung on the display device 10 according to an embodiment of the present invention, FIG. 2A is a schematic diagram showing the telescopic arm 120 of the optical detecting device 100 of FIG. 1 being located within the receiving box 110, FIG. 2B is a schematic diagram showing the telescopic arm 120 of FIG. 2A protruding with respect to the receiving box 110, and FIG. 2C is a bottom-view of the light shielding 130 of FIG. 2A, and FIG. 2D is a top-view showing of a number of first conductive portions 112 and a number of second conductive portions 122 in FIG. 2A.

As shown in FIG. 1, the optical detecting device 100 is applied to the display device 10. The display device 10 has a display panel 11 and a first electrical connection port 12, and the first electrical connection port 12 is disposed on a side of the display panel 11. The optical detecting device 100 can inspect or detect the color information of the screen displayed on the display panel 11. When the optical detecting device 100 is hung on the display device 10, the first electrical connection port 12 is electrically coupled to a second electrical connection port 111 of the optical detecting device 100, so that the detecting signal of the optical detecting device 100 is transmitted, through the first electrical connection port 12 and the second electrical connection port 111, to a controller (not illustrated) electrically couple to the first electrical connection port 12. In addition, one of the first electrical connection port 12 and the second electrical connection port 111 is, for example, an elastic conductive post, such as a Pogo Pin, and the other of the first electrical connection port 12 and the second electrical connection port 111 is, for example, a connector capable of matching the elastic conductive post.

As shown in FIG. 2A, the optical detecting device 100 includes a receiving box 110, a telescopic arm 120 and a light shielding 130. The receiving box 110 includes the second electrical connection port 111 and the first conductive portion 112 electrically coupled to the second electrical connection port 111. The telescopic arm 120 is slidably disposed within the receiving box 110. The telescopic arm 120 includes an optical sensor 121 and the second conductive portion 122, wherein the second conductive portion 122 is electrically connected to the optical sensor 121. When the second electrical connection port 111 is electrically coupled to the first electrical connection port 12 and the telescopic arm 120 slides relative to the receiving box 110 in a number of different positions, the optical sensor 121 may be located at different sensing positions relative to the display panel 11, and the first conductive portion 112 and the second conductive portion 122 can maintain an electrically-connecting state. As a result, the telescopic arm 120 is located at a number of different positions relative to the receiving box 110 to receive light from different positions of the screen of the display panel 11 for detecting color of the screen.

The sensing positions at least include a middle position and/or an edge position of the display surface 11s of the display panel 11 (close to the frame of the display device 10).

As shown in FIG. 2A, the receiving box 110 has a receiving space 110a, and the telescopic arm 120 is slidably disposed in the receiving space 110a. In addition, the transverse sectional shape of the receiving space 110a (such as the cross-sectional shape along the YZ plane) and the transverse sectional shape of the telescopic arm 120 (such as the cross-sectional shape along the YZ plane) are polygonal, such as triangular, rectangular or other non-circular shapes. As a result, the telescopic arm 120 can be prevented from rotating about the X-axis, and it can avoid the offset between the first conductive portion 112 and the second conductive portion 122.

As shown in FIGS. 2A and 2B, the first conductive portion 112 includes a sliding slot 112r and a conductive layer 1121. The conductive layer 1121 is formed on an inner wall of the sliding slot 112r. The second conductive portion 122 is, for example, a conductive post and is slidably disposed on the sliding slot 112r. The second conductive portion 122 always/normally contacts with the conductive layer 1121. As a result, regardless of the relative position of the receiving box 110 and the telescopic arm 120, the second conductive portion 122 and the conductive layer 1121 of the first conductive portion 112 can maintain an electrically-connecting state. In addition, the conductive layer 1121 is, for example, a metal layer such as a copper layer.

As shown in FIG. 2A, the conductive layer 1121 continuously extends at opposite two ends of the corresponding sliding slot 112r, such as the first end 112r1 and the second end 112r2.

In addition, as shown in FIG. 2A, the sliding slot 112r may have a number of recesses, such as a first recess 112a1 and a second recess 112a2, which are respectively located at the first end 112r1 and the second end 112r2 of the sliding slot 112r, that is, a number of recesses are located at the opposite two limit-positions of the sliding stroke. In another embodiment, the recess may not be located at the first end 112r1 and/or the second end 112r2 of the sliding slot 112r, but at any position between the first end 112r1 and the second end 112r2. In another embodiment, the number of recesses of the sliding slot 112r may be one or more than two. In addition, the first conductive portion 112 is, for example, an elastic conductive pillar such as a Pogo Pin. When the first conductive portion 112 is located in the corresponding recess, the first conductive portion 112 falls into the corresponding recess due to the elastic force (such as along the Y-axis direction) to provide an engagement feeling of engagement and the relative position of the telescopic arm 120 and the receiving box 110 could be temporarily fixed. Since the first conductive portion 112 has elasticity, the recess and the first conductive portion 112 could be separated by a slight/appropriate force, and the telescopic arm 120 and the receiving box 110 can be returned to the slidable state.

In other embodiments, the first conductive portion 112 includes the sliding slot 112r and a number of contacts (not shown) separated from each other, and the contacts are formed on an inner wall of the sliding slot 112r. When the optical sensor 121 is in the sensing positions with respect to the receiving box 110, the first conductive portion 112 is electrically connected to different contacts to electrically connect the optical sensor 121 and the second electrical connection port 111. When the optical sensor 121 is not in the sensing positions relative to the receiving box 110, the first conductive portion 112 is not in contact with any contact, and thus the optical sensor 121 is electrically separated from the second electrical connecting port 111. In this example, the sliding slot 112r can also have a number of separate recesses, wherein each contact is formed in a concave surface of the corresponding recess. When the first conductive portion 112 is located at the corresponding recess, the first conductive portion 112 falls into the corresponding recess due to the elastic force, and similarly the above-described engagement feeling and temporary fixing effect can be provided.

As shown in FIG. 2A, the extending direction of the sliding slot 112r of the first conductive portion 112 is the same as the telescopic direction of the telescopic arm 120 with respect to the receiving box 110. For example, the extending direction of the sliding slot 112r and the telescopic direction of the telescopic arm 120 with respect to the receiving box 110 are the X-axis direction of FIG. 2A.

As shown in FIGS. 2A, 2B, and 2D, the light shielding 130 is disposed on the telescopic arm 120 and has an opening 130a and an end surface 130s, wherein the opening 130a is exposed from the end surface 130s. The optical sensor 121 is disposed within the light shielding 130 and has a sensing surface 121s, and the sensing surface 121s is exposed from the opening 130a of the light shielding 130 to receive the screen light from the display panel 11.

Furthermore, as shown in FIGS. 2A and 2C, the end surface 130s of the light shielding 130 surrounds the opening 130a in closed way (that is, the end surface 130s is a closed ring-shaped surface), and the light shielding 130 is formed of an opaque material. As a result, when the optical detecting device 100 is hung on the display device 10, as shown in FIG. 1, the leakage amount of the screen light within the light shielding 130 can be reduced, and even the amount of light leakage will not occur. As a result, the accuracy of the color correction for the display screen of the display panel 11 (because the amount of light leakage is less, the receiving light intensity is increased) can be increased.

In addition, as shown in FIG. 2A, the receiving box 110 has an outer surface 110s, and the end surface 130s protrudes from the outer surface 110s. As a result, when the optical detecting device 100 is hung on the display device 10, as shown in FIG. 1, most or almost the entire end surface 130s is in tight contact with the display surface 11s of the display panel 11 of the display device 10. As a result, a gap between the end surface 130s of the light shielding 130 and the display surface 11s of the display panel 11 can be reduced (or even there is no gap), so as to reduce the leakage amount of the screen light from the gap, or even there is no light leakage, thereby improving the accuracy of color correction for the display screen of the display panel 11 (because the amount of light leakage is less, the receiving light intensity is increased).

As shown in FIG. 2D, the number of the second conductive portions 122 is four, which are respectively a power line, a grounding line and a number of signal lines. The signal lines in the present embodiment are exemplified by two, but the embodiment of the present invention is not limited thereto. The number of the first conductive portions 112 is the same as that of the second conductive portion 122, wherein each first conductive portions 112 is slidably disposed on the corresponding second conductive portion 122. In another embodiment, the number of second conductive portions 122 may be less than or more than four depending on the video signal requirements and/or device functions.

Figure 3A:
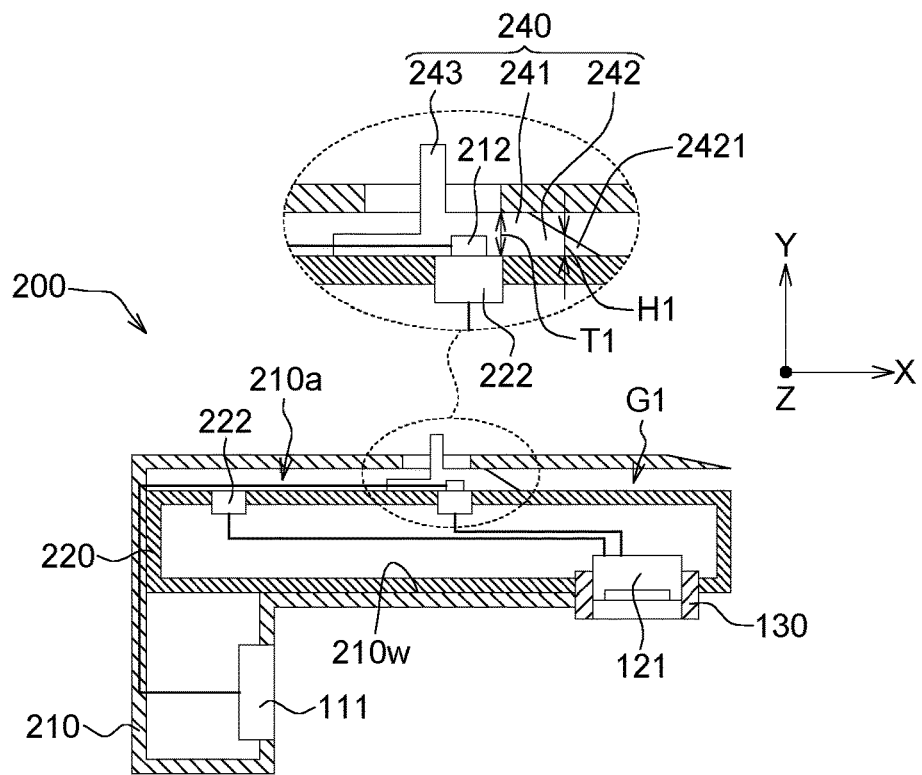
FIGS. 3A to 3D are diagrams showing the process of the optical detecting device being changed from the collapsed state to the extended state according to another embodiment of the present invention.
Figure 3B:
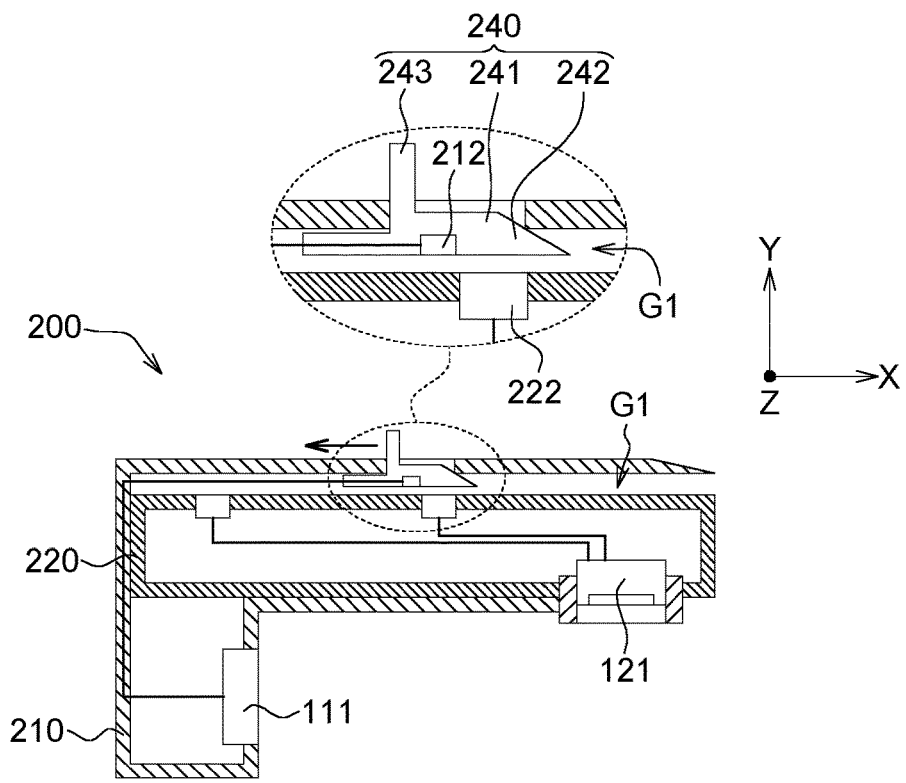
Figure 3C:
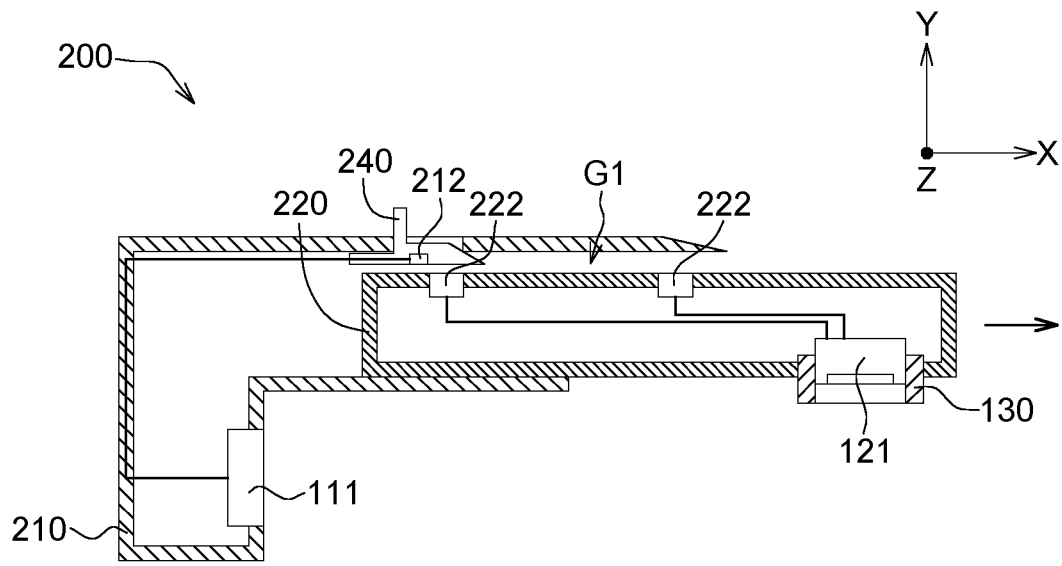
Figure 3D:
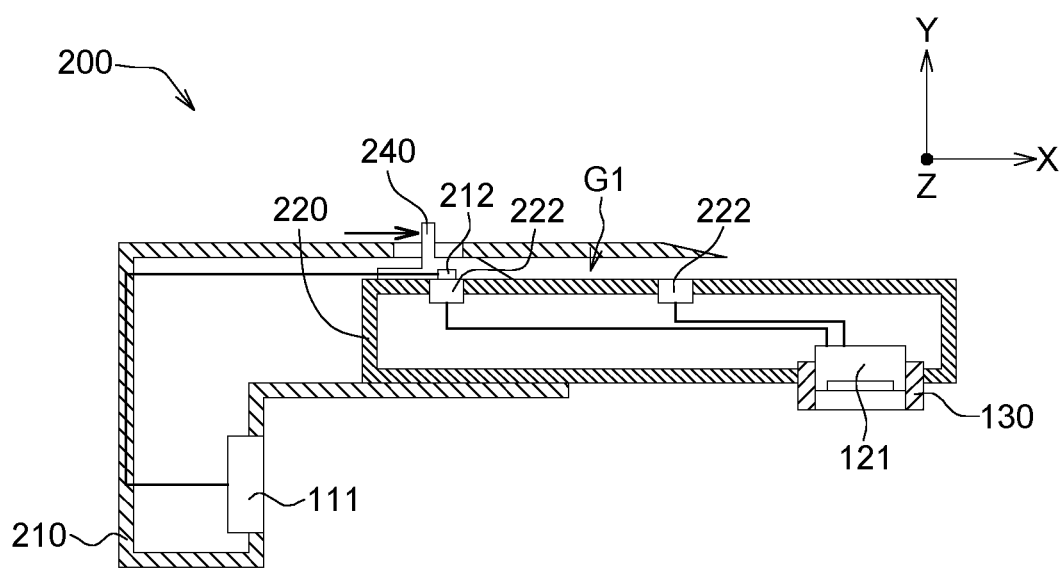
Figure 3E:
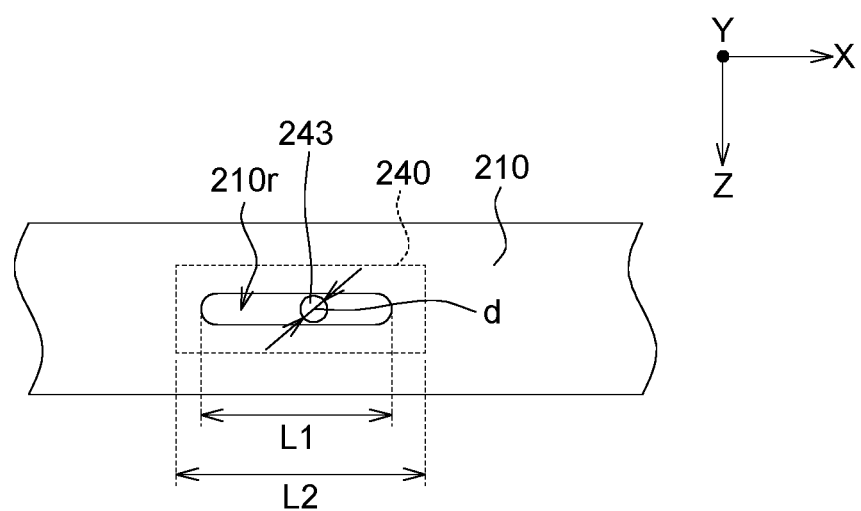
FIG. 3E is a top-view showing the abutting element and the receiving box.

Referring to FIG. 3A to FIG. 3E, FIGS. 3A to 3D are diagrams showing the process of the optical detecting device 200 being changed from the collapsed state to the extended state according to another embodiment of the present invention, and FIG. 3E is a top-view showing the abutting element 240 and the receiving box 210.

As shown in FIG. 3A, the optical detecting device 200 includes the receiving box 210, a first conductive portion 212, a telescopic arm 220, the light shielding 130 and the abutting element 240.

The receiving box 110 includes the second electrical connection port 111. The first conductive portion 212 is electrically coupled to the second electrical connection port 111. The telescopic arm 220 is slidably disposed in the receiving box 210 and includes the optical sensor 121 and a number of second conductive portions 222 separated from each other. The second conductive portions 222 are electrically connected to the optical sensor 121. When the second electrical connection port 111 is electrically coupled to the first electrical connection port 12 and the telescopic arm 220 slides relative to the receiving box 210 at a number of different positions, the optical sensor 121 faces different sensing positions of the display panel 11 and the first conductive portion 212 is electrically connected to the different second conductive portion 222. As such, the telescopic arm 120 can be positioned at a number of different positions relative to the receiving box 110 to receive light from different screen positions of the display panel 11 for screen color detection.

The receiving box 210 has a receiving space 210a, and the telescopic arm 220 is slidably disposed in the receiving space 210a. Furthermore, the transverse sectional shape of the receiving space 210a (such as the transverse sectional shape along the YZ plane) and the cross-sectional shape of the telescopic arm 220 (such as the transverse sectional shape along the YZ plane) are polygonal shape, such as triangular, rectangular or other non-circular shapes. As a result, the telescopic arm 220 can be prevented from being rotating about the X-axis, and it can avoid the offset of the first conductive portion 212 and the second conductive portion 222. Furthermore, one of the first conductive portion 112 and the second conductive portion 222 is, for example, an elastic conductive post such as the Pogo Pin, and the other of the first conductive portion 112 and the second conductive portion 222 is, for example, a connector capable of matching the Pogo Pin. In addition, the number of the first conductive portions 212 and/or the type of the transmitted signal is similar to those of the first conductive portion 112, and the similarities are not repeated here. Further, the two second conductive portions 222 shown in FIG. 3A each has the same number as the first conductive portions 212. For example, similar to the description of FIG. 2D, the number of the first conductive portions 212 is, for example, four, and the number of any second conductive portions 222 shown in FIG. 3A is the same as the number of the first conductive portions 212.

As shown in FIG. 3A, there is a gap G1 between the receiving box 210 and the telescopic arm 220. The abutting element 240 of the optical detecting device 200 is partially located in the gap G1 and includes a pressing portion 241, a first extending portion 242 and a lever 243, wherein the first extending portion 242 and the lever 243 are connected to the pressing portion 241. At least two of the pressing portion 241, the first extending portion 242 and the lever 243 are integrally formed into one-piece structure, or the entire abutting element 240 is an one-piece structure.

A thickness T1 of the pressing portion 241 is substantially equal to a width of the gap G1. As a result, when the pressing portion 241 is pushed into the gap G1, as shown in FIG. 3A, the pressing portion 241 is tightly fitted in the gap G1 to press the telescopic arm 220 against the inner side wall 210w of the receiving space 210a of the receiving box 210 for temporarily fixing the relative position between the telescopic arm 220 and the receiving box 210.

Further, as shown in FIG. 3A, the first conductive portion 212 is disposed within the abutting element 240 to move with the abutting element 240. In addition, the first conductive portion 212 is exposed from the outer surface of the abutting element 240 to electrically contact the second conductive portion 222. When the optical sensor 121 is in the sensing position with respect to the receiving box 210, the pressing portion 241 of the abutting element 240 is tightly fitted in the gap G1 and the first conductive portion 212 disposed in the abutting element 240 is electrically contacted the corresponding second conductive portion 222. For example, as shown in FIG. 3A, when the optical sensor 121 is in one of several sensing positions with respect to the receiving box 210, the pressing portion 241 is located in the gap G1 and the first conductive portion 212 is electrically contacted with one of the two second portions 222, such that the optical sensor 121 is electrically coupled to the second electrical connection port 111 through the first conductive portion 212 and the second conductive portion 222. As shown in FIG. 3B, when the optical sensor 121 is in another of the sensing positions with respect to the receiving box 210, the pressing portion 241 is located in the gap G1 and the first conductive portion 212 is electrically contacted with another of the second conductive portion 222, such that the optical sensor 121 is electrically coupled to the second electrical connection port 111 through the first conductive portion 212 and the second conductive portion 222.

As shown in FIG. 3B, the abutting element 240 can be pushed backwardly, such that the pressing portion 241 is separated from the gap G1 to release the telescopic arm 220 (to lift the fixed relationship between the receiving box 210 and the telescopic arm 220). Due to the pressing portion 241 releasing the telescopic arm 220, the telescopic arm 220 and the receiving box 210 can slide relative to each other. Furthermore, when the pressing portion 241 is separated from the gap G1, the first conductive portion 212 and the second conductive portion 222 are separated (electrically separated) from each other.

In addition, as shown in FIGS. 3A and 3B, the first extending portion 242 of the abutting element 240 is connected to the pressing portion 241. Furthermore, the abutting element 240 is an insulating abutting element. The material of the abutting element 240 can be made of plastic. The height H1 of the first extension portion 242 is gradually reduced from the pressing portion 241 to a free end 2421 of the first extension portion 242. By gradually-reduced design for the height of the first extending portion 242, when the pressing portion 241 is separated from the gap G1, as shown in FIG. 3B, the first extending portion 242 is disposed within the gap G1 in way of loose fit without interfering with the telescopic arm 220. As a result, the receiving box 210 and the telescopic arm 220 can maintain a freely slidable state except that the abutting element 240 is not detached from the receiving box 210.

As shown in FIGS. 3A and 3E, the receiving box 210 has an opening 210r. The lever 243 of the abutting element 240 is coupled to the pressing portion 241 and protrudes from the opening 210r to facilitate manual operation by the user. The length L1 of the opening 210r is larger than the outer diameter d1 of the lever 243, so that the lever 243 can slide along the length extending direction of the opening 210r to selectively fix or release the relative position of the telescopic arm 220 and the receiving box 210. As shown in FIG. 3E, the length L2 of the abutting element 240 along the extending direction of the opening 210r is greater than the length L1 of the opening 210r in the extending direction. As a result, the abutting element 240 and the receiving box 210 can be easily separated.

As shown in FIG. 3C, since the abutting element 240 releases the telescopic arm 220, the telescopic arm 220 can slide relative to the receiving box 210 to adjust the relative position between the optical sensor 121 and the receiving box 210. When the relative position of the optical sensor 121 and the receiving box 210 is determined, for example, when the position of the first conductive portion 212 is corresponding to one of the second conductive portions 212, as shown in FIG. 3D, the abutting element 240 can be pushed to abut the pressing portion 241 of the member 240 to move to the gap G1 until the pressing portion 241 is tightly fitted to the gap G1. After the pressing portion 241 is tightly fitted to the gap G1, as described above, the abutting element 240 presses the telescopic arm 220 against the receiving box 210 and the first conductive portion 212 disposed in the abutting element 240 is electrically contacted to the corresponding second conductive portion 222.

Figure 4A:
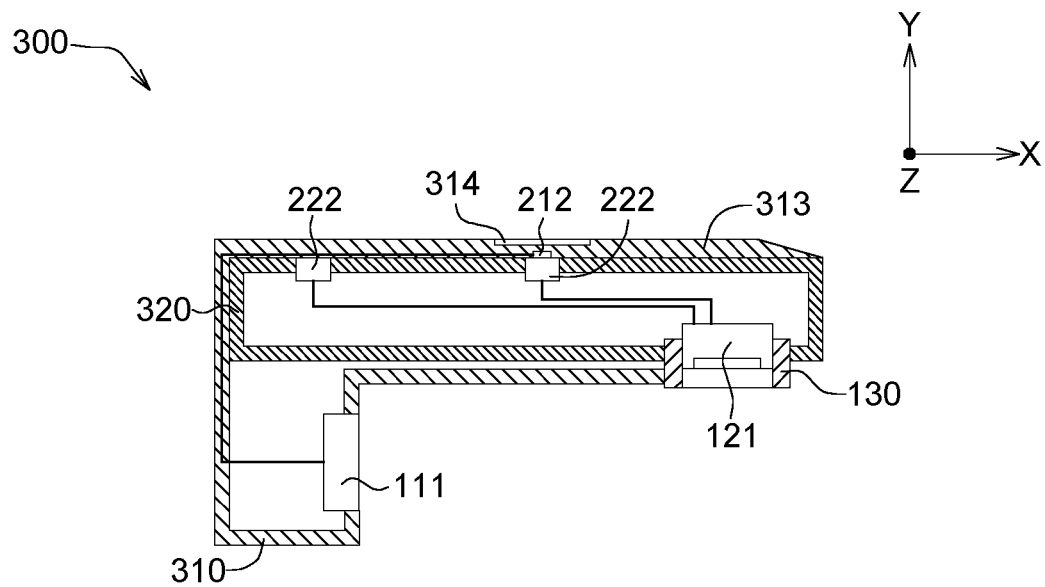
FIG. 4A is a schematic view showing the telescopic arm of the optical detecting device in the receiving box according to another embodiment of the present invention.
Figure 4B:
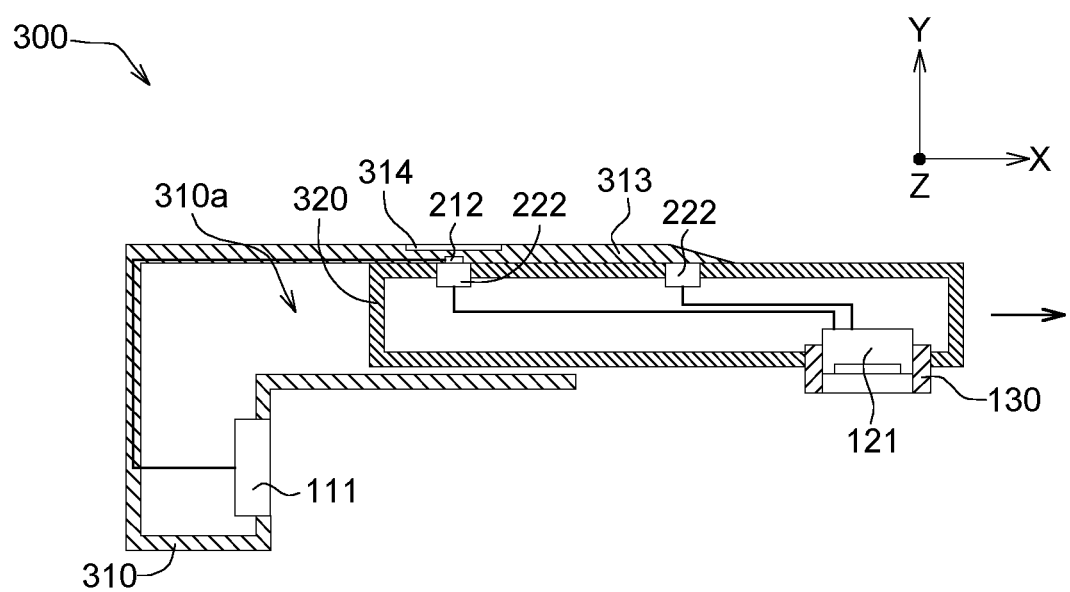
FIG. 4B is a schematic view showing the telescopic arm of FIG. 4A stretching relative to the receiving box.

Referring to FIGS. 4A to 4B. FIG. 4A is a schematic view showing the telescopic arm 320 of the optical detecting device 300 in the receiving box 310 according to another embodiment of the present invention, and FIG. 4B is a schematic view showing the telescopic arm 320 of FIG. 4A stretching relative to the receiving box 310.

As shown in FIG. 4A, the optical detecting device 300 includes a receiving box 310, a telescopic arm 320 and the light shielding 130. The receiving box 310 includes the second electrical connection port 111, the first conductive portion 212, a box body 313 and a magnetic element 314. The first conductive portion 212 is electrically coupled to the second electrical connection port 111. The telescopic arm 320 is slidably disposed in the receiving box 310 and includes the optical sensor 121 and a number of second conductive portions 222 separated from each other. The second conductive portions 222 are electrically connected to the optical sensor 121. When the second electrical connection port 111 is electrically coupled to the first electrical connection port 12 and the telescopic arm 220 slides relative to the receiving box 210, the optical sensor 121 faces a number of different sensing positions of the display panel 11, and the first conductive portion 212 is electrically connected with different second conductive portions 222. As such, the telescopic arm 120 can be positioned at a number of different positions relative to the receiving box 110 to receive light from different screen positions of the display panel 11 for screen color detection.

The receiving box 310 has a receiving space 310a, and the telescopic arm 320 is slidably disposed in the receiving space 310a. The transverse sectional shape of the receiving space 310a (for example, the transverse sectional shape along the YZ plane) and the transverse sectional shape of the telescopic arm 320 (for example, the transverse sectional shape along the YZ plane) are polygonal, such as triangular, rectangular, or other non-circular shapes. As a result, the telescopic arm 320 can be prevented from rotating about the X-axis, and thus it can avoid the offset between the first conductive portion 212 and the second conductive portion 222.

As shown in FIG. 4A, the magnetic element 314 is disposed within the box body 313 and the position of the magnetic element 314 is corresponding to one of the first conductive portions 212. Each second conductive portion 222 is a magnetic conductive portion and is closer to the telescopic arm 320 than the magnetic member 314. Thus, when the position of the magnetic element 314 is corresponding to the first conductive portion 212, magnetic attraction force is generated between the magnetic element 314 and the first conductive portion 212, and the magnetic force drives the distance between the first conductive portion 212 and the magnetic member 314 to be shortened until the first conductive portion 212 is electrically contacted with the second conductive portion 222, as shown in FIG. 4A. In an embodiment, the magnetic element 314 is, for example, a magnet.

Since the telescopic arm 320 and the receiving box 310 are temporarily fixed by the magnetic attraction force, the temporary fixing relationship between the telescopic arm 320 and the receiving box 310 can be released by a slight/appropriate force. After the fixed relationship between the telescopic arm 320 and the receiving box 310 is released, the relative position of the telescopic arm 320 and the receiving box 310 is allowed to be adjusted. When one of the second conductive portions 222 disposed in the telescopic arm 320 is close to the position of the first conductive portion 212, as shown in FIG. 4B, magnetic attraction is generated between the magnetic member 314 and the first conductive portion 212. The magnetic attraction drives the distance between the first conductive portion 212 and the magnetic element 314 to be shortened until the first conductive portion 212 and the second conductive portion 222 are electrically contacted.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical detecting device, applicable to a display device having a display panel and a first electrical connection port disposed on a side of the display panel, comprises:

a receiving box comprising a second electrical connection port and a first conductive portion electrically coupled to the second electrical connection; and a telescopic arm slidably disposed in the receiving box and comprising an optical sensor and a second conductive portion, wherein the second conductive portion is electrically connected to the optical sensor;

wherein when the second electrical connection port is electrically coupled to the first electrical connection port and the telescopic arm slides relative to the receiving box, the optical sensor faces a plurality of different sensing positions of the display panel, and the first conductive portion and the second conductive portion maintain an electrically-connecting state.

2. The optical detecting device according to claim 1, wherein the first conductive portion comprises a sliding slot and a conductive layer, the conductive layer is formed on an inner wall of the sliding slot, and the second conductive portion is a conductive pillar, slidably disposed in the sliding slot and electrically contacted the conductive layer.

3. The optical detecting device according to claim 2, wherein an extending direction of the sliding slot is the same as a telescopic direction of the telescopic arm.

4. The optical detecting device according to claim 2, wherein the conductive layer continuously extends between opposite two ends of the corresponding sliding slot.

5. The optical detecting device according to claim 1, further comprises:
a light shielding disposed on the telescopic arm and has an opening and an end surface, wherein the opening is exposed from the end surface and the end surface surrounds the opening in closed way;
wherein the optical sensor is disposed within the light shielding and having a sensing surface, and the sensing surface is exposed from the opening of the light shielding.

6. The optical detecting device according to claim 5, wherein the receiving box has an outer surface, the end surface of the light shielding protrudes from the outer surface.

7. The optical detecting device according to claim 1, wherein the first conductive portion comprises a sliding slot and a plurality of contacts separated from each other, the contacts are formed on an inner wall of the sliding slot; when the optical sensor is in the sensing positions relative to the receiving box, the first conductive portion is electrically connected to the different contacts.

8. The optical detecting device according to claim 7, wherein the first conductive portion is an elastic conductive pillar, and the sliding slot has a plurality of recesses, and each contact is formed on a concave surface of the corresponding recess.

9. The optical detecting device according to claim 8, wherein the recesses comprises a first recess and a second recess, and the first recess and the second recess are respectively located at opposite two ends of the sliding slot.

10. The display device according to claim 1, wherein the receiving box has a receiving space, and the telescopic arm is slidably disposed in the receiving space, and a cross-sectional shape of the receiving space and a cross-sectional shape of the telescopic arm are polygonal.

11. An optical detecting device, applicable to a display device having a display panel and a first electrical connection port disposed on a side of the display panel, comprises:
a receiving box comprising a second electrical connection port;

a first conductive portion electrically coupled to the second electrical connection port;

a telescopic arm slidably disposed in the receiving box and comprising an optical sensor and a plurality of second conductive portions separated from each other, wherein the second conductive portions are electrically connected to the optical sensor;

wherein when the second electrical connection port is electrically coupled to the first electrical connection port and the telescopic arm slides relative to the receiving box, the optical sensor faces a plurality of different sensing positions of the display panel, and the first conductive portion is electrically connected to the different second conductive portion.

12. The optical detecting device according to claim 11, wherein there is a gap between the receiving box and the telescopic arm, the optical detecting device further comprises an abutting element, the first conductive is partly disposed in the abutting element, and the abutting element is located in the gap and comprises a pressing portion, a thickness of the pressing portion is substantially equal to a width of the gap.

13. The optical detecting device according to claim 12, wherein when the optical sensor is in the sensing positions with respect to the receiving box, the pressing portion is tightly disposed in the gap and the first conductive portion is electrically connected to the corresponding second conductive portion; when the pressing portion is separated from the gap, the first conductive portion is separated from the second conductive portions.

14. The optical detecting device according to claim 12, wherein the abutting element further comprises a first extending portion, the first extending portion is connected to the pressing portion, and a height of the first extending portion is gradually reduced from the pressing portion toward a free end of the first extending portion.

15. The optical detecting device according to claim 12, wherein the receiving box has an opening, the abutting element comprises a lever connecting the pressing portion and extending from the opening, and a length of the opening is larger than a outer diameter of the lever.

16. The optical detecting device according to claim 15, wherein the abutting element has a length in an extending direction of the opening is greater than the length of the opening in the extending direction.

17. The optical detecting device according to claim 11, wherein the receiving box comprises:
a box body; and
a magnetic element disposed in the box body, wherein a position of the magnetic element is corresponding to the first conductive portion;
wherein each second conductive portion is a magnetic conductive portion.

18. The optical detecting device according to claim 11, wherein the receiving box has a receiving space, and the telescopic arm is slidably disposed in the receiving space, and a cross-sectional shape of the receiving space and a cross-sectional shape of the telescopic arm are polygonal.

19. The optical detecting device according to claim 11, further comprises:
a light shielding having an opening and an end surface, wherein the opening is exposed from the end surface and the end surface surrounds the opening in closed way;

wherein the optical sensor is disposed within the light shielding and having a sensing surface, and the sensing surface is exposed from the opening of the light shielding.

20. The optical detecting device according to claim 19, wherein the receiving box has an outer surface protruding from the outer surface.

* * * * *